US008028204B2

(12) United States Patent
Baxter, III et al.

(10) Patent No.: US 8,028,204 B2
(45) Date of Patent: Sep. 27, 2011

(54) METHOD AND SYSTEM FOR MAINTENANCE OF A DATA-PROCESSING APPARATUS

(75) Inventors: James E Baxter, III, Canandalgua, NY (US); Russell John Sokao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 203 days.

(21) Appl. No.: 12/408,405

(22) Filed: Mar. 20, 2009

(65) Prior Publication Data

US 2010/0241910 A1 Sep. 23, 2010

(51) Int. Cl.
*G06F 11/00* (2006.01)

(52) U.S. Cl. .............................. 714/57; 714/25; 714/47.1

(58) Field of Classification Search .................... 714/25, 714/26, 49, 48, 47, 57, 46, 47.1
See application file for complete search history.

(56) References Cited

U.S. PATENT DOCUMENTS

| | | | | |
|---|---|---|---|---|
| 6,654,801 B2 * | 11/2003 | Mann et al. | ................... | 709/224 |
| 6,721,879 B1 | 4/2004 | Tanaka | ................. | 713/1 |
| 6,813,634 B1 * | 11/2004 | Ahmed | ........................ | 714/47 |
| 7,028,228 B1 * | 4/2006 | Lovy et al. | ..................... | 714/47 |
| 7,451,443 B2 | 11/2008 | Lowell et al. | ..................... | 718/1 |
| 7,454,606 B2 | 11/2008 | Marquiz | ........................... | 713/1 |
| 7,467,161 B2 | 12/2008 | Frisina | ........................ | 707/104.1 |
| 7,788,536 B1 * | 8/2010 | Qureshi et al. | .................. | 714/48 |
| 2008/0010471 A1 | 1/2008 | Aksamit et al. | ............... | 713/300 |
| 2008/0028407 A1 | 1/2008 | Venkataraman | .............. | 718/103 |
| 2008/0082587 A1 | 4/2008 | Yada et al. | .................... | 707/200 |
| 2008/0126870 A1 | 5/2008 | Odani | ............................. | 714/37 |
| 2008/0172242 A1 | 7/2008 | Hyatt | ................................. | 705/1 |
| 2008/0178186 A1 | 7/2008 | Capek et al. | ................. | 718/103 |

FOREIGN PATENT DOCUMENTS

| | | |
|---|---|---|
| WO | WO 96/29664 | 9/1996 |
| WO | WO 02/39199 A1 | 5/2002 |

\* cited by examiner

*Primary Examiner* — Robert Beausoliel, Jr.
*Assistant Examiner* — Joseph D Manoskey
(74) *Attorney, Agent, or Firm* — Kermit D. Lopez; Luis M. Ortiz; Ortiz & Lopez, PLLC

(57) ABSTRACT

A method and system for performing one or more preventative maintenance functions for a data-processing apparatus. One or more notifications regarding daily maintenance functions can be generated in the form of a reminder when the data-processing apparatus begins operation. A history of the maintenance functions performed can be stored in a memory through remote data pushes. An email alert can be generated and transmitted to a user regarding incomplete maintenance functions in order to track the maintenance activities. The data-processing apparatus can be monitored in a consolidated manner and the occurrence of fault information stored and then rapidly retrieved to provide notifications indicative of such maintenance data.

20 Claims, 5 Drawing Sheets

METHOD AND SYSTEM FOR MAINTENANCE OF A DATA-PROCESSING APPARATUS

TECHNICAL FIELD

Embodiments are generally related to data-processing systems and methods. Embodiments also relate in general to the field of computers and similar technologies and in particular to software utilized in this field. In addition, embodiments also relate to methods and systems for performing maintenance operation(s) for a data-processing system.

BACKGROUND OF THE INVENTION

Computer systems such as, for example, desktop computers and rack mounted server systems require periodic maintenance and servicing. Typical maintenance operations with respect to such computer systems include replacing faulty hardware and adding new hardware (e.g., I/O adapter boards, memory cards, CPUs), upgrading and patching operating systems, upgrading and patching software applications, and performing server reconfiguration where necessary. The majority of prior art computer systems utilize some form of preventative maintenance in order to avoid fault conditions. Preventative maintenance can be performed on the computer systems to maintain the system running well with quality output and to protect the system from possible breakdowns and extend the lifetime. Preventative maintenance can also be utilized to perform scheduled maintenance cleaning in order to prevent system problems thereby reducing the risk of data loss or hardware failure.

Typically, preventative maintenance can be initiated by employing a technician off site in order to manage and maintain the computer system. Such an approach, however, requires the operator be well versed in both equipment part location and maintenance procedures. Unfortunately, computer maintenance is ignored by most computer users due to laziness, lack of understanding, lack of training, operator turnover, and lack of feedback from the operator.

Based on the foregoing, a need exists for an improved method and system for performing daily preventative maintenance functions for a data-processing apparatus. A need also exists for an improved method for notifying occurrence of a fault condition.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system, and computer-usable medium.

It is another aspect of the present invention to provide for an improved method and system for performing preventative maintenance functions for a data-processing apparatus.

It is a further aspect of the present invention to provide for an improved method for notifying occurrence of a fault condition.

The aforementioned aspects and other objectives and advantages can now be achieved as described herein. A method and system for performing one or more preventative maintenance functions (e.g., on a daily, weekly or other periodic basis) for a data-processing apparatus is disclosed herein. Notifications indicative of daily maintenance functions, for example, can be generated in the form of one or more reminders when the data-processing apparatus begins operations. A history of the maintenance functions performed can be stored in a memory (e.g., a data storage device) through remote data pushes. An email alert can be generated and sent regarding incomplete maintenance functions in order to keep track of the maintenance activities. The data-processing apparatus can be monitored in a consolidated manner and the occurrence of fault information can be stored and rapidly retrieved through an appropriate retrieval procedure.

A mechanism can be provided to determine if the maintenance functions are time oriented and/or shift oriented. The fault information can be stored and accumulated as fault records, which can be utilized for generating a notification indicative of a fault occurring in the future. The notification can also be sent when replaceable units associated with the data-processing apparatus requires service. The reminder and the fault notification can be displayed on a monitor associated with the data-processing apparatus in order to provide controlled maintenance for the data-processing apparatus. The occurrence of fault can be treated for assuring continued operation of the data-processing apparatus with minimum disruption and notice of such fault occurrence can guide maintenance activity for providing uninterrupted system operation. Such a method and system enhance the performance of the data-processing apparatus and extend the life expectancy.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
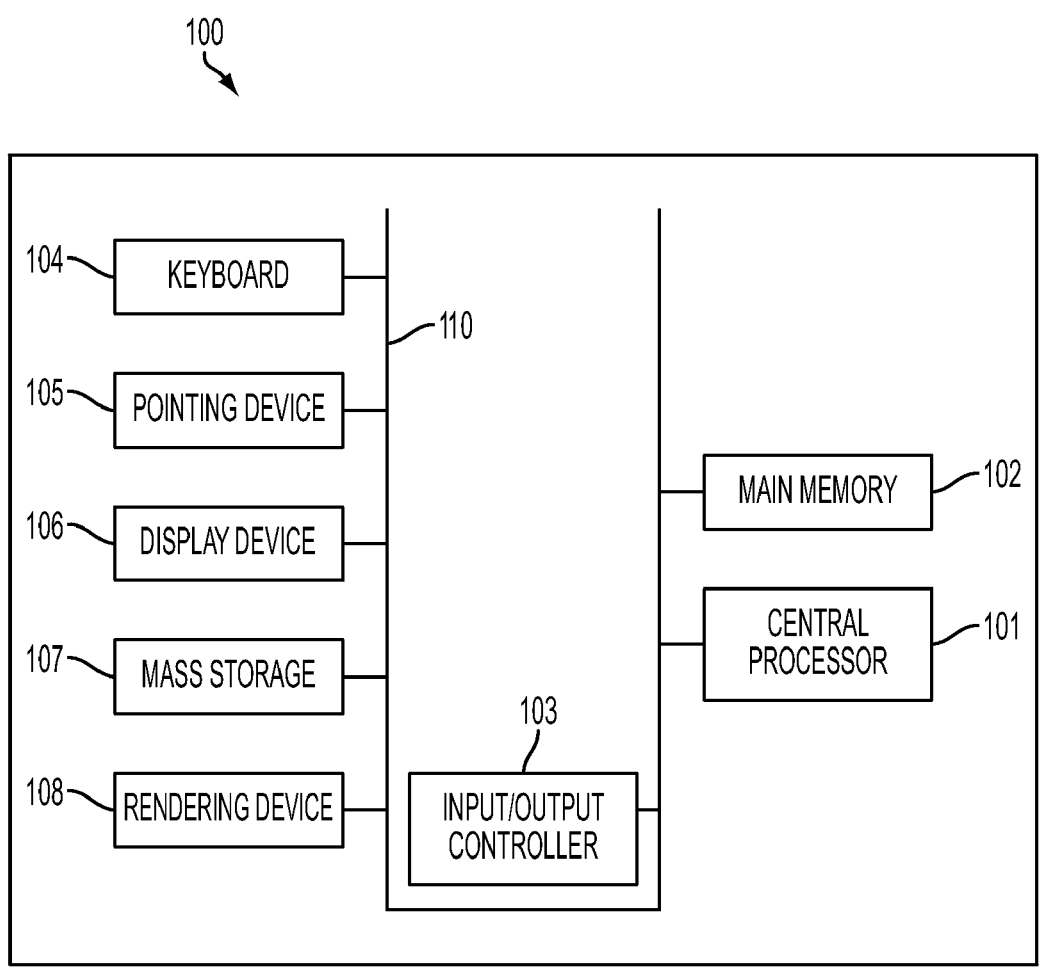
FIG. 1 illustrates a schematic view of a data-processing system in which the present invention may be embodied.
Figure 2:
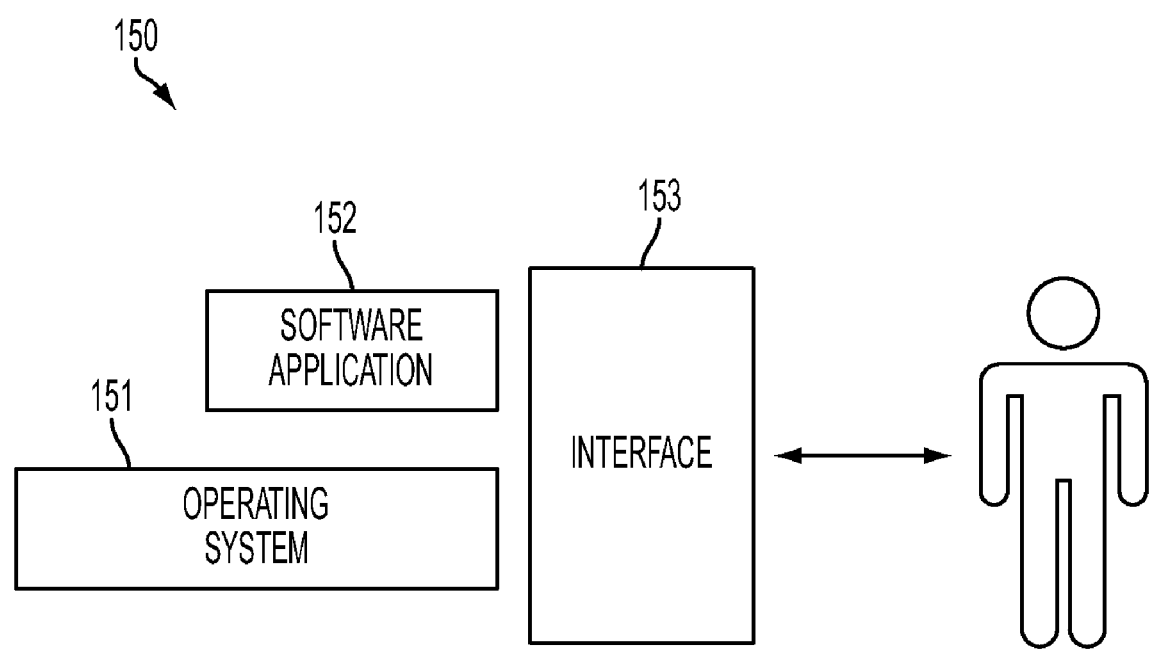
FIG. 2 illustrates a schematic view of a software system including an operating system, application software, and a user interface for carrying out the present invention.
Figure 3:
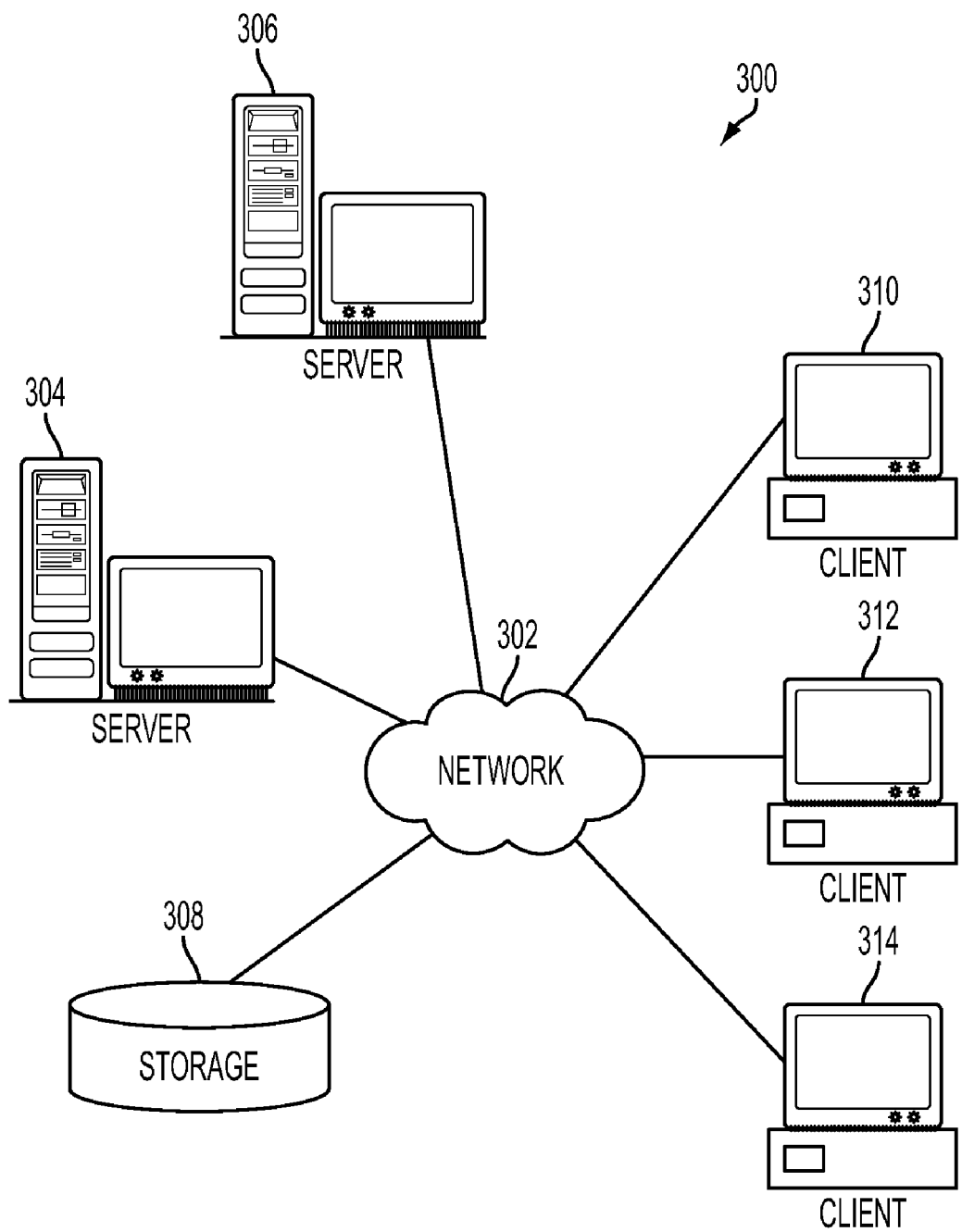
FIG. 3 depicts a graphical representation of a network of data-processing systems in which aspects of the present invention may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. Note that the rendering device 108 may constitute, for example, a printer, a copier, fax machine, scanner, and/or other types of rendering components, depending upon design considerations. As illustrated, the various components of the data-processing apparatus 100 communicate through a system bus 110 or similar architecture.

FIG. 2 illustrates a computer software system 150 for directing the operation of the data-processing apparatus 100 depicted in FIG. 1. Software system 150, which is stored in main memory 102 and on mass storage 107, can include a kernel or operating system 151 and a shell or interface 153. One or more application programs, such as application software 152, may be "loaded" (i.e., transferred from mass storage 107 into main memory 102) for execution by the data-processing apparatus 100. The data-processing apparatus 100 receives user commands and data through user interface 153; these inputs may then be acted upon by the data-processing apparatus 100 in accordance with instructions from operating system module 151 and/or application software module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. Application software module 152, on the other hand, can include instructions such as the various operations described herein with respect to the various components and modules described herein such as, for example, the method 500 depicted in FIG. 5.

FIG. 3 illustrates a graphical representation of a network of data processing systems in which aspects of the present invention may be implemented. Network data processing system 300 can be provided as a network of computers in which embodiments of the present invention may be implemented. Network data processing system 300 contains network 302, which is the medium used to provide communications links between various devices and computers connected together within network data processing apparatus 300. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients 310, 312, and 314 may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing apparatus 100, computer software system 150, network data-processing system 300, and network 302 depicted respectively in FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
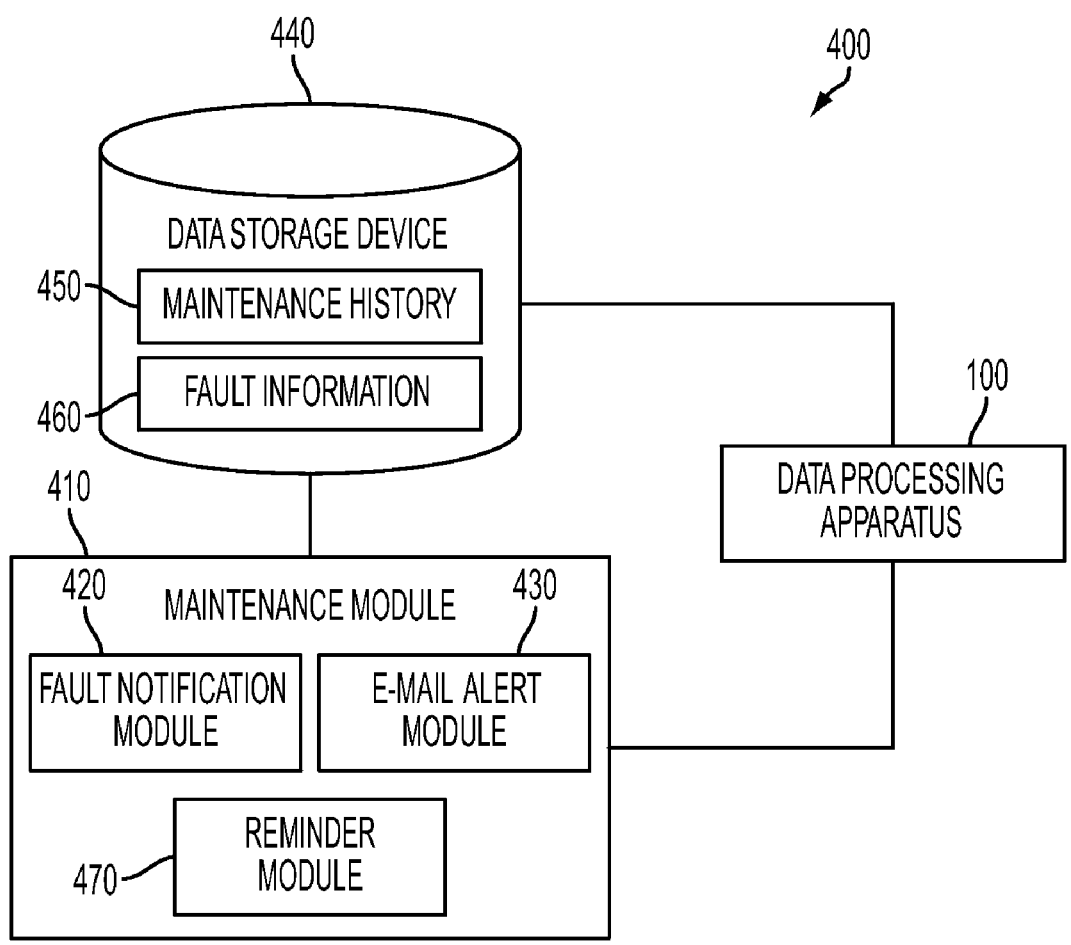
FIG. 4 illustrates a block diagram of a maintenance management system for the data-processing apparatus depicted in FIG. 1, in accordance with a preferred embodiment.

FIG. 4 illustrates a block diagram of a maintenance management system 400 for the data-processing apparatus 100 depicted in FIG. 1, in accordance with a preferred embodiment. Systems and methods are disclosed for maintaining and servicing the data-processing apparatus 100. Note that in FIGS. 1-5, identical or similar blocks are generally indicated by identical reference numerals. The maintenance management system 400 can instruct the data-processing apparatus 100 when to execute a maintenance function and the specific maintenance function to execute. The maintenance management system 400 can also monitor results of the maintenance functions. For example, the data-processing apparatus 100 can provide results of maintenance functions to maintenance management system 400. The maintenance management system 400 can be utilized for performing daily (or other periodic) maintenance functions in the data-processing apparatus 100.

Note that as utilized herein, the maintenance functions generally refers to a predetermined set of activities that can be performed on the data-processing apparatus 100 in order to maintain the data-processing apparatus 100 running well with quality output. The routine (e.g., daily, weekly, etc.) maintenance functions includes, but is not limited to, servicing hardware and software, performing hardware and software reconfiguration, tuning hardware, and modifying software (e.g. upgrading, patching, tuning). Examples of servicing the data-processing apparatus 100 includes adding new memory;

replacing or adding I/O devices, adapters and controllers; replacing faulty CPUs in multiprocessors; upgrading, patching, reconfiguring and rebooting operating systems; and upgrading and patching applications. The periodic (e.g., daily) maintenance functions also include, but are not limited to, for example, deleting cookies, backups, antivirus, windows updates, spyware/adware, taking out trash, checking disks for errors, defragmenting hard drives and the like. It can be appreciated, of course, that other types of maintenance functions are possible.

The maintenance management system 400 comprises a maintenance module 410, which includes a reminder module 470, a fault notification module 420 and an email alert module 430. The maintenance module 410 can be an application software module 152 that can include instructions such as the various operations described herein with respect to the various components and modules described herein. The maintenance module 410 reminds a designated individual at the start of running the data-processing apparatus 100 to perform periodic/routine (e.g., daily, weekly, etc) maintenance functions.

The value of performing daily maintenance functions, for example, can be evidenced through the use of the reminder module 470. The conception of reminding the designated individual to perform periodic (e.g., daily) preventative maintenance activities replaces a customer replaceable unit or performs fault recovery actions. The maintenance module 410 determines whether the maintenance functions are copy oriented, time oriented and/or shift oriented tasks. A maintenance history 450 related to the performed maintenance functions can be stored on a data storage device 440 through remote data pushes. The email alert module 430 can send an alert via e-mail to the designated individual if the required routine (e.g., daily) maintenance function is not being performed.

Status information related to the daily maintenance functions, for example, can also be stored in the data storage device 440. The data storage device 440 is also capable of storing fault information 460 that occurred while performing, for example, daily maintenance functions. The designated individual or a customer service engineer may have the ability to clear the data stored in the data storage device 440. The customer service engineer generally provides on or off-site corrective or preventative maintenance and offers after-sales technical support solutions.

The fault information 460 such as a software or hardware fault associated with the data-processing apparatus 100 can be automatically and instantly notified to the user by the fault notification module 420. The detailed information regarding the occurrence of fault can be previously stored in the data storage device 440. By virtue of such arrangement, when the fault occurred at a later time, a notification can be displayed in the display device 106 associated with the data-processing apparatus 100 in order to provide controlled maintenance for the data-processing apparatus 100. The fault notification module 420 collects, stores and accumulates the fault information 460 received from the data-processing apparatus 100. The notification can also be sent when replaceable units associated with the data-processing apparatus 100 requires service.

As required, detailed embodiments of the present invention are disclosed herein; however, it is to be understood that the disclosed embodiments are merely exemplary of the invention that may be embodied in various and alternative forms. The specific structural details disclosed herein are not to be interpreted as limiting, but merely as a representative basis for the claims and/or as a representative basis for teaching one skilled in the art to variously employ the present invention.

Figure 5:
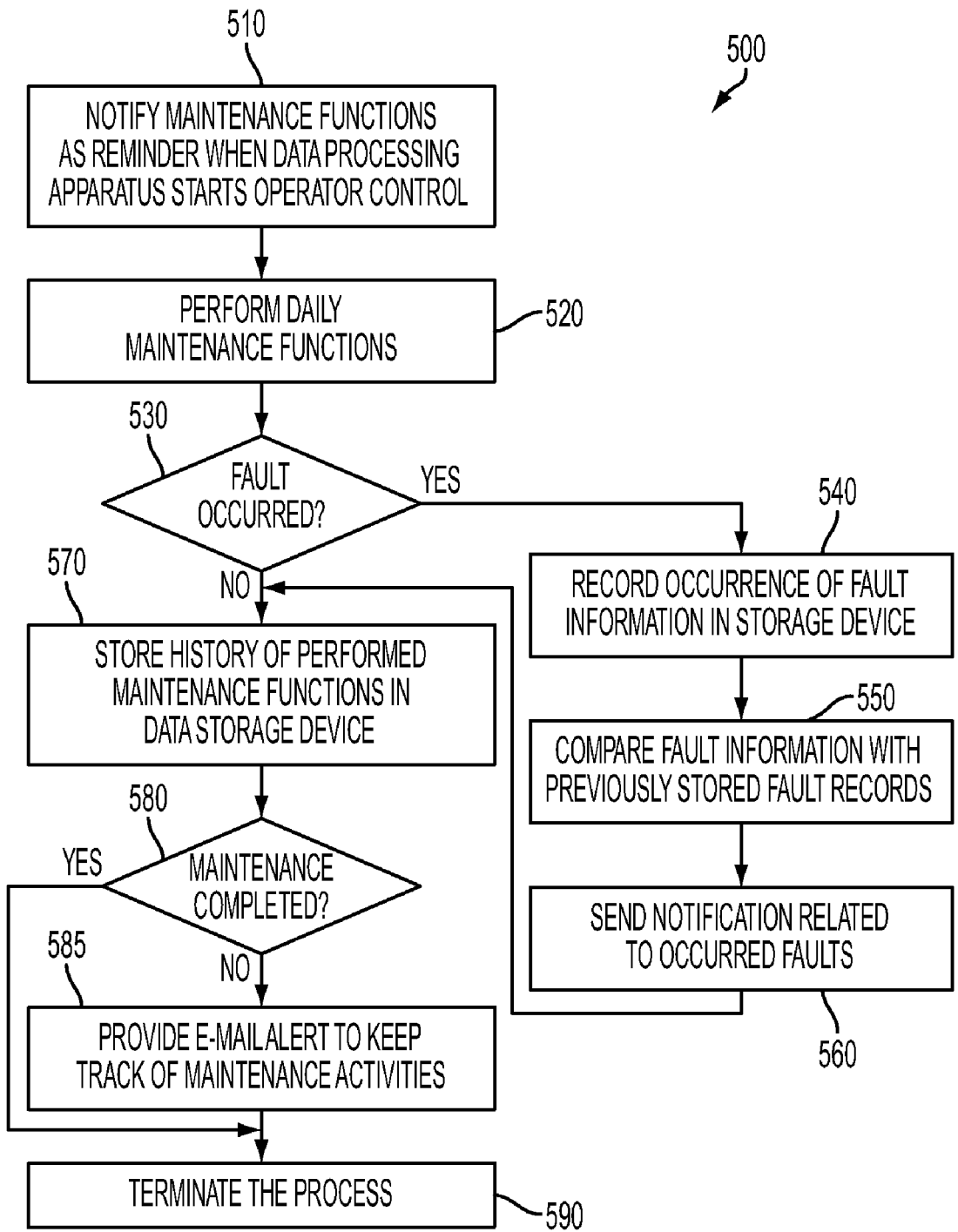
FIG. 5 illustrates a flow chart of operations illustrating logical operational steps of a method for performing daily (or other periodic) preventative maintenance functions for the data-processing apparatus, in accordance with a preferred embodiment.

FIG. 5 illustrates a flow chart of operations illustrating logical operational steps of a method 500 for performing periodic (e.g., daily) preventative maintenance functions for the data-processing apparatus 100, in accordance with a preferred embodiment. Note that the method 500 can be implemented in the context of a computer-useable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIGS. 1-3.

The periodic (e.g., daily) maintenance function can be notified as a reminder by the reminder module 470 at the start of running the data-processing apparatus 100, as illustrated at block 510. The reminder can be displayed automatically when the data-processing apparatus 100 starts operator control. The maintenance module 410 can also provide a notification concerning the value of performing the daily maintenance functions, which may remind a user of the importance of having routine maintenance functions. Thereafter, the daily maintenance functions can be performed, as depicted at block 520. A determination can be made whether a fault condition has occurred when performing the maintenance function, as depicted at block 530. If a fault condition has occurred, the information related to the occurred faults can be recorded in the internal data storage device 440, as shown at block 540. The fault information 460 can be compared with the fault records previously stored in the data storage device 440, as illustrated at block 550.

The notification related to the occurred faults can then be sent to the designated user by the fault notification module 420, as illustrated at block 560. Otherwise, a maintenance history 450 related to the performed maintenance functions can be stored in the internal data storage device 440, as depicted at block 570. A determination can then be made if the maintenance functions are completed, as shown at block 580. If the maintenance functions are completed the process can be terminated, as illustrated at block 590. Otherwise, an e-mail alert can be provided in order to keep track of maintenance activities and the process can be terminated, as depicted at block 585.

It is believed that by utilizing the system and approach described herein, the daily maintenance operations for the data-processing apparatus 100 can be performed. The occurrence of fault can be treated for assuring continued operation of the data-processing apparatus 100 with minimum disruption and notice of such fault occurrence can guide maintenance activity while obtaining, to the greatest extent possible, uninterrupted system operation. Such an approach enhances the performance of the data-processing apparatus 100 and extends the life expectancy.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data-processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for performing and tracking preventative maintenance of a data-processing apparatus, said method comprising:
    providing a notification to a predetermined e-mail address of at least one maintenance function associated with a data-processing apparatus in a form of a reminder, wherein said reminder is sent automatically when said data-processing apparatus begins operation;
    detecting an occurrence of a fault condition related to said data-processing apparatus and comparing said fault condition to previously stored fault conditions determining if a previous maintenance request was not properly addressed; and
    automatically transmitting an alert if said at least one maintenance function was not properly addressed, in order to track said at least one maintenance function's relationship with the fault condition.

2. The method of claim 1 wherein transmitting further comprises:
    sending an e-mail alert to a predetermined e-mail address.

3. The method of claim 1 further comprising storing within said memory, a history related to said at least one maintenance function performed and not performed on said data-processing apparatus.

4. The method of claim 1 further comprising monitoring said data-processing apparatus in a consolidated manner.

5. The method of claim 1 further comprising displaying said reminder on a display device associated with said data-processing apparatus in order to provide preventative maintenance with respect to said data-processing apparatus.

6. The method of claim 1 further comprising determining if said at least one maintenance function is time oriented.

7. The method of claim 1 further comprising determining if said at least one maintenance function is shift oriented.

8. The method of claim 1 further comprising authorizing a user to clear a history related to said at least one maintenance function.

9. A system for performing and tracking preventative maintenance of a data-processing apparatus, said system comprising:
    a processor;
    a data bus coupled to said processor; and
    a computer-usable medium embodying computer code, said computer-usable medium being coupled to said data bus, said computer program code comprising instructions executable by said processor and configured to:
    provide a notification of at least one maintenance function associated with the data-processing apparatus as a reminder, wherein said reminder displays automatically when said data-processing apparatus begins operation;
    detect an occurrence of a fault condition related to said data-processing apparatus and to compare said fault condition to a previously stored maintenance reminder to indicate that a previous maintenance reminder was not properly addressed; and
    to automatically generate an alert if said at least one maintenance function was not properly addressed.

10. The system of claim 9 wherein automatically generating said alert further comprises:
    sending an e-mail alert to a particular user if said at least one maintenance function is not completed in order to track said at least one maintenance function.

11. The system of claim 9 wherein said instructions are further configured to store a history related to said at least one maintenance function performed and not performed on said data-processing apparatus.

12. The system of claim 9 wherein said instructions are further configured to monitor said data-processing apparatus in a consolidated manner.

13. The system of claim 9 wherein said instructions are further configured to display said reminder on a display device associated with said data-processing apparatus to provide a controlled maintenance related to said data-processing apparatus.

14. The system of claim 9 wherein said instructions are further configured to determine if said at least one maintenance function is time oriented.

15. The system of claim 9 wherein said instructions are further configured to determine if said at least one maintenance function is shift oriented.

16. The system of claim 9 wherein said instructions are further configured to authorize a user to clear a history related to said at least one maintenance function.

17. A non-transitory computer-usable storage medium for performing and tracking maintenance of a data-processing apparatus, comprising a computer program code that when executed by a computer causes the computer to:
    provide a notification of at least one maintenance function associated with a data-processing apparatus in a form of a reminder, wherein said reminder displays automatically when said data-processing apparatus begins operations;
    detect an occurrence of a fault condition with respect to said data-processing apparatus and to compare said fault condition to a maintenance reminder previously stored in a memory, to provide a rapid notification of said occurrence of said fault condition; and
    automatically generate an alert if said at least one maintenance function was not completed, in order to track said at least one maintenance function's relationship to the fault condition.

18. The non-transitory computer-usable storage medium of claim 17 wherein said automatic generation of said alert, further comprises:
   sending an e-mail alert to a predetermined e-mail address if said at least one maintenance function is not completed in order to track said at least one maintenance function.

19. The non-transitory computer-usable storage medium of claim 17 wherein said embodied computer program code further comprises computer executable instructions configured to store a history related to said at least one maintenance function performed on said data-processing apparatus.

20. The non-transitory computer-usable storage medium of claim 17 wherein said embodied computer program code further comprises computer executable instructions configured to monitor said data-processing apparatus in a consolidated manner.

* * * * *